Patented Aug. 14, 1923.

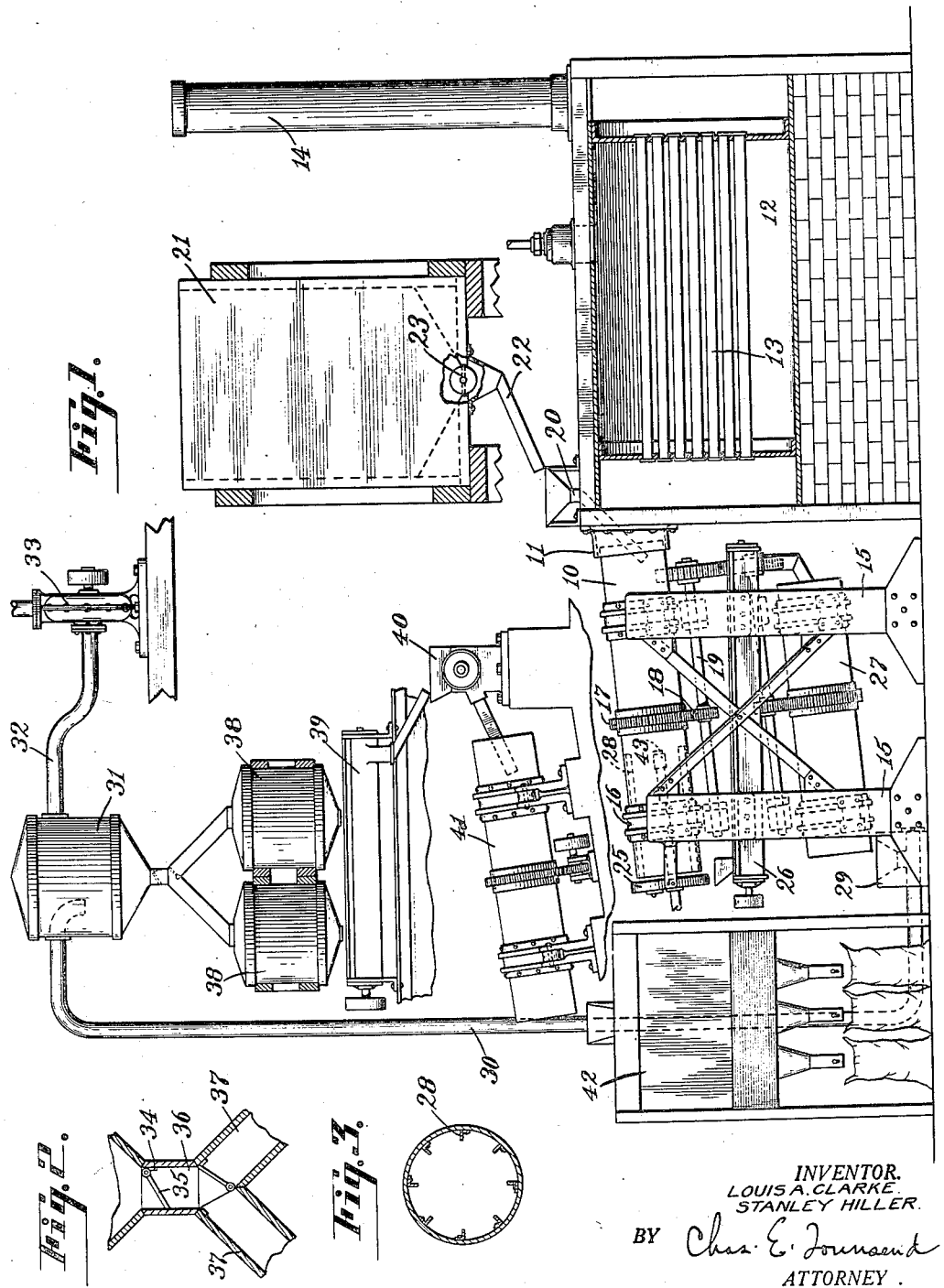

1,465,131

UNITED STATES PATENT OFFICE.

STANLEY HILLER AND LOUIS A. CLARKE, OF SAN JOSE, CALIFORNIA, ASSIGNORS TO THE PACIFIC BY-PRODUCTS COMPANY, OF SAN JOSE, CALIFORNIA, A CORPORATION OF CALIFORNIA.

METHOD OF PRODUCING CHARCOAL AND APPARATUS THEREFOR.

Application filed January 12, 1921. Serial No. 436,710.

*To all whom it may concern:*

Be it known that we, STANLEY HILLER and LOUIS A. CLARKE, citizens of the United States, residing at San Jose, in the county of Santa Clara and State of California, have invented new and useful Improvements in Methods of Producing Charcoal and Apparatus Therefor, of which the following is a specification.
This invention relates to a method of producing charcoal, and an apparatus therefor.

It is the principal object of the present invention to provide a method and means whereby a high grade charcoal may be continuously and rapidly produced, preferably from fruit pits and the like, and in a manner to insure that the charcoal will be thoroughly oxidized during its production, and at the same time embodying means by which the oxidization may be brought about by the combustion of the gases of the raw material, which burning gases may be utilized as a source of power, all of which operation is continuous and insures that raw material may be directly carried through the apparatus and delivered as a final product into sacks, without danger of subsequent spontaneous combustion.

The present invention contemplates the use of a burning chamber into which the raw material is delivered and burned by the combustion of its own gases, said gases preferably passing to a boiler and serving as a heating medium therefor, while the charred product is thereafter thoroughly oxidized, pulverized and finally supplied to a feed hopper, from which it may be sacked or otherwise shipped.

The invention is illustrated by way of example in the accompanying drawings, in which:

Figure 1 is a view in diagram showing a pneumatic arrangement of the plant by which the present invention is carried out.
Fig. 2 is an enlarged fragmentary view showing the feed trap in the bottom of the suction tank.

Fig. 3 is a fragmentary view in transverse section showing the formation of the oxidizing drums.

Referring more particularly to the drawings: 10 indicates a rotary kiln which is disposed at a slight angle to the horizontal, so that the material delivered thereto may gradually gravitate to the lower end thereof. The upper end of the kiln is rotatably mounted within a sleeve 11, secured to the end wall of a boiler housing 12, and through which the products of combustion from the kiln may pass to a boiler structure 13, and from thence to a stack 14.

The kiln 10 is cylindrical and is here shown as supported by frame members 15, which members carry supporting rollers engaging channel shaped track bands 16. A ring gear 17 is secured around the kiln and is driven by a meshing gear 18 carried on a drive shaft 19.

The raw product from which the charcoal is to be made is delivered to the upper end of the kiln through a feed spout 20, which in turn is supplied from a feed bin 21 through a spout 22. A positive rotated feed gate 23 is mounted in the bottom of the bin and therefore regulates the rate of feed of the material, it being understood that the continuous action of the present process requires a constant and continuous feed of material. This is provided for in the present instance by allowing an accumulation of the raw product in the bin 21.

The lower end of the kiln 10 is covered by a plate 25, around and through which the atmosphere may pass to the kiln and supply a desired amount of oxygen to support combustion therein. It is also designed to permit the burned product to fall from the lower end of the kiln and on to a conveyor 26. This conveyor will lead the product to the upper end of an oxidizing cylinder 27. This cylinder is continuously rotated in the manner described for the kiln and is open at both ends. The interior face of the cylinder is fitted with a plurality of flights 28, which act to gather the material and to lift it so that it will be thoroughly aerated as it gravitates to the lower end of the cylinder.

At the lower end of the cylinder, the material which is now charcoal is delivered into a hopper 29. This hopper is connected with a suction pipe 30, which is led upwardly to an overhead suction tank 31. The upper end of the pipe is turned down within this tank, so that the solid material will be trapped therein, while the air will be drawn out through a pipe 32 by the action of a fan 33. This elevation of the material will act to further aerate it, and at the same time remove all of the objectionable matter of greater specific gravity than the charcoal. As the charcoal accumulates within the suction tank 31, it will finally overcome the action of a spring 34 supporting a door 35 in the outlet throat 36 of the tank. When this has been done, the door will swing down to allow the charcoal to escape, after which it will be restored to the action of the spring, until such a time as a quantity of charcoal is again accumulated.

The throat 36 is preferably connected with two feed pipes 37 leading to storage bins 38 and then delivered to a conveyor 39. From this conveyer the charcoal is delivered to a grinder 40 within which the product may be reduced to a desired fineness, after which it is carried into a second oxidizing cylinder 41, where the ground charcoal is again subjected to the action of the atmosphere, to further complete its oxidization. This product is fed into a storage hopper 42 from which it may be delivered to sacks or other containers, as desired. This cylinder is fitted with the flights 28 previously described in the cylinder 22, and it is also to be understood that similar flights 28 are mounted in the lower end of the kiln and extend partially the length thereof, or in fact to a point adjacent a water spray, 43, by which the charcoal is dampened after gravitating from the flame.

In operation of the present invention, fruit pits or other material to be used, is delivered to the bin 21 and accumulates there to insure a continuous feed as the feed member 23 rotates to permit the escapement of the raw product to the feed spout 20. The kiln is continuously rotating and initial combustion is set up therein by use of an oil burner or other means to ignite the pits. When these pits are ignited, they burn with a very hot yellow flame, and as they gravitate toward the lower end of the kiln, the flame will diminish, finally changing to a blue flame, which appears to be gradually dampened until the burned material is in the state of glowing coals. These coals move down and within the kiln until they are sprayed with water from the spray 43. This will sufficiently cool them to turn the charcoal black, after which further rotation of the kiln will tend to agitate and aerate the charcoal due to the flights 28, and thus when the charcoal passes from the kiln on to the conveyer 26, it will be at a temperature sufficiently cool to permit handling. This conveyor delivers the charcoal to the cylinder 27, where it is further aerated and then deposited within the hopper 29. A suction therein will tend to elevate the charcoal and continue the aerating process. The charcoal will thus be drawn up into the tank 31 from which it may gravitate through the storage bins 38 to the grinder 40, thereafter being again aerated in its finely divided state and delivered to the bin 42.

By an actual test, the charcoal thus produced has proven to have higher absorption qualities than willow charcoal or in fact any of the "twice burned" charcoals now on the market. It has further developed that the thorough aeration and oxidization of the charcoal has eliminated any possibility of spontaneous combustion, and in fact the charcoal has proven to be so free from spontaneous combustion that it can be directly poured into the sacks within which it is dispensed, without previously having to lay upon a cooling floor for twelve to fourteen days, as is now the requirement.

It will thus be seen that by the use of the apparatus here disclosed and the method concerned therewith, that a high grade of charcoal may be continuously produced from fruit pits and the like, without requiring the use of a burning medium other than the gases produced by the raw material during the course of its heating and burning, and at the same time insuring the final product would be thoroughly free from oxidizing constituents.

While I have shown the preferred form of my invention as now known to me, it will be understood that various changes might be made in the arrangement of the apparatus and the steps of the process by those skilled in the art, without departing from the spirit of the invention as claimed.

Having thus described my invention, what I claim and desire to secure by Letters Patent is:

1. A process of producing charcoal from fruit pits, which consists in continuously feeding the raw material to the kiln, charring the same therein by its own combustion under normal atmospheric conditions while it is being passed through the kiln, and then agitating and aerating the same to thoroughly complete the oxidation thereof.

2. A process of producing charcoal which consists in causing the raw material to be ignited and to continuously burn by its own heat, supplying it with oxygen of the air, and smothering the burning action by the gasses which result from the combustion of the raw material.

3. A process of producing charcoal from fruit pits which consists in continuously feeding the raw material to a rotary kiln, charring the same therein by its own combustion, quenching the same thereafter with a liquid, and then mechanically agitating the same to thoroughly aerate it to complete the oxidation thereof.

4. A process of continuously producing carbonaceous material which consists in continuously and uniformly delivering the raw material to a kiln, and therein charring the material by its own combustion, thereafter causing the product to gravitate along the length of the kiln until its combustion is dampened at the point where the final gas given off by the raw product is burned, thereafter subjecting the product to the cooling action of water, then mechanically aerating the product, after which it is reduced to a desired finely divided state and again aerated to complete oxidization.

5. A method of producing charcoal, one step of which consists in burning the charcoal by its own heat and under normal atmospheric conditions, said air being controlled to insure a smothering and termination of the burning action at a point where the desired carbonaceous material may be obtained.

6. A method of producing charcoal, one step of which consists in burning the charcoal by its own heat and under normal atmospheric conditions, said air being controlled to insure a termination of the burning action at a point where the desired carbonaceous material may be obtained, and thereafter freely aerating the product, to complete oxidization without burning.

STANLEY HILLER.
LOUIS A. CLARKE.